United States Patent [19]

Bauer

[11] 3,915,504

[45] Oct. 28, 1975

[54] AXLE ADAPTOR

[76] Inventor: Wolfgang Bauer, 19 Pine Court, Box 391, Dowling, Ontario, Canada

[22] Filed: Feb. 27, 1974

[21] Appl. No.: 446,163

[52] U.S. Cl. .......................... 301/130; 301/124 R
[51] Int. Cl.² ........................................ B60B 35/00
[58] Field of Search ..................... 301/124 R, 130

[56] References Cited
UNITED STATES PATENTS

| | | | |
|---|---|---|---|
| 357,828 | 2/1887 | Hoepfner | 301/130 |
| 1,372,813 | 3/1921 | Helseth | 301/130 |
| 1,480,223 | 1/1924 | Robechaud | 301/130 |

Primary Examiner—Lloyd L. King
Assistant Examiner—D. W. Keen

[57] ABSTRACT

An axle adaptor for providing a temporary replacement axle spindle on an axle from which the original spindle has fractured comprises a replacement spindle welded at its inner end to a cup defining an inwardly facing recess for receiving the end of the original axle shaft. A bracing angle member is secured externally to the cup and extends inwardly. A shaft-clamping shackle effectively comprising a U-bolt is provided toward the inner end of the angle member for firmly clamping the adaptor to the existing axle shaft. Radially extending clamping bolts usefully extend through the wall of the cup to provide additional clamping action.

8 Claims, 5 Drawing Figures

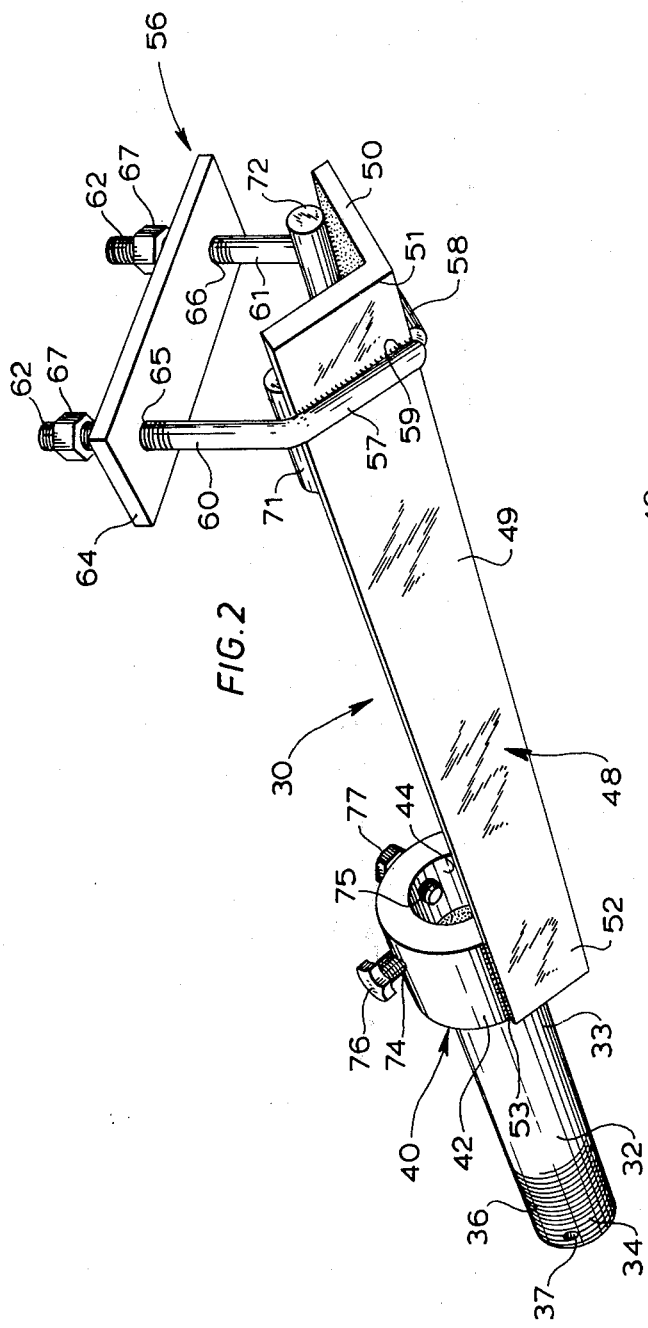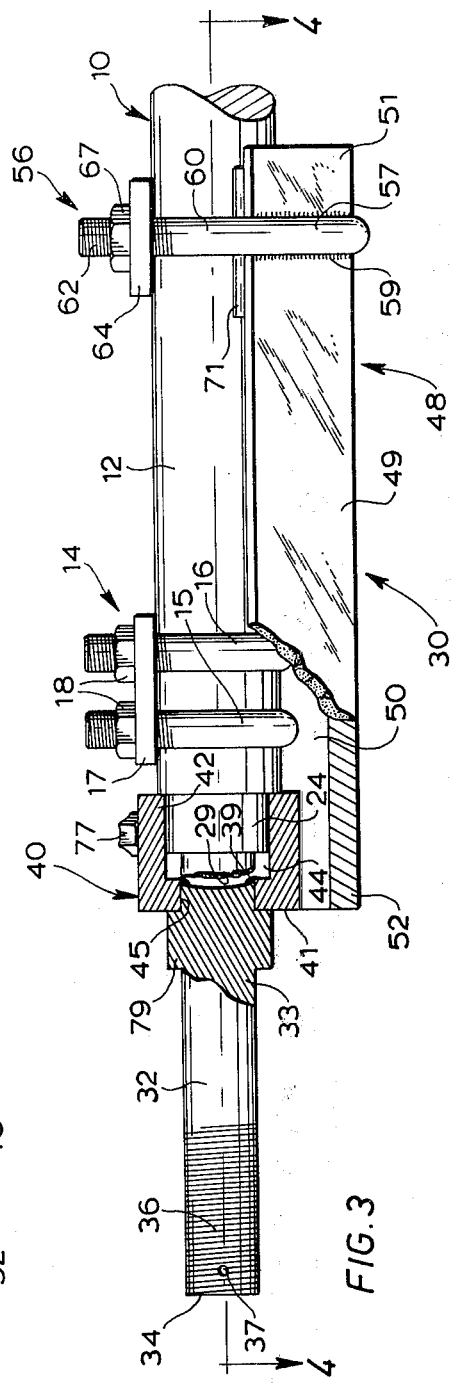

AXLE ADAPTOR

BACKGROUND OF THE INVENTION

The present invention relates to axle adaptors and more particularly to an axle adaptor which can be used to provide a temporary replacement wheel-carrying axle spindle in the event of fracture of the axle spindle of an existing axle.

With the ever growing use of lightweight trailers for transporting boats, campers, snowmobiles, camping equipment and the like and more particularly with the ever increasing abuse of such trailers by their being towed along unpaved roads at speeds far above those at which the axles of such vehicles are intended to be used, the failure of such axles is becoming a more and more common occurrence.

When the axle spindle of a trailer axle is subjected to such excessive stresses that it fractures, such fracture will, as is well known, occur at the position of greatest stress. In most trailer axles as presently in use, such fracture generally occurs through the axle spindle just inwardly of the wheel bearings carried by that spindle and just outwardly of a larger diameter portion formed at the inner end of the spindle for providing a seating for a grease seal.

Various axle adaptors have heretofore been proposed but none of the previously proposed adaptors have been specifically suited for use on lightweight trailers.

It is accordingly a principal object of this invention to provide an axle adaptor particularly suited for such use.

It is another object of this invention to provide an axle adaptor which is relatively simple and, therefore, relatively inexpensive in its construction.

Yet another object of this invention is to provide an axle adaptor which is easily fitted on the axle of a vehicle and which, when so fitted on axle, provides an axle spindle which is disposed in the same axial position as the original axle spindle.

Other objects of the invention will become apparent as the description herein proceeds.

SUMMARY OF THE INVENTION

An axle adaptor in accordance with this invention is broadly defined as comprising an axle spindle having inner and outer ends; a cup secured to said axle spindle at said inner end thereof and defining a recess essentially coaxial with said spindle and facing inwardly for receiving the end of a broken axle shaft on which said adaptor can be secured; a bracing member having inner and outer ends and secured at said outer end thereof to said cup externally thereof to extend inwardly therefrom and generally parallel to said axle spindle; and a shackle on said bracing member toward said inner end thereof for securing said adaptor on an axle shaft with said axle spindle coaxial with such an axle shaft.

Other features of the invention and the advantages presented thereby will become apparent as the description herein proceeds.

BRIEF DESCRIPTION OF THE DRAWINGS

The invention will now be described merely by way of illustration with reference to the accompanying drawings in which:

FIG. 2 is a perspective view from below of one embodiment of an axle adaptor in accordance with this invention for providing a temporary repair of an axle as shown in FIG. 1 in the event that the spindle of such an axle should fracture;

FIG. 3 is an elevational view with certain parts shown in section and illustrating the manner in which the adaptor shown in FIG. 2 is fitted to a broken axle of the type shown in FIG. 1;

DESCRIPTION OF THE PREFERRED EMBODIMENT

Figure 1:
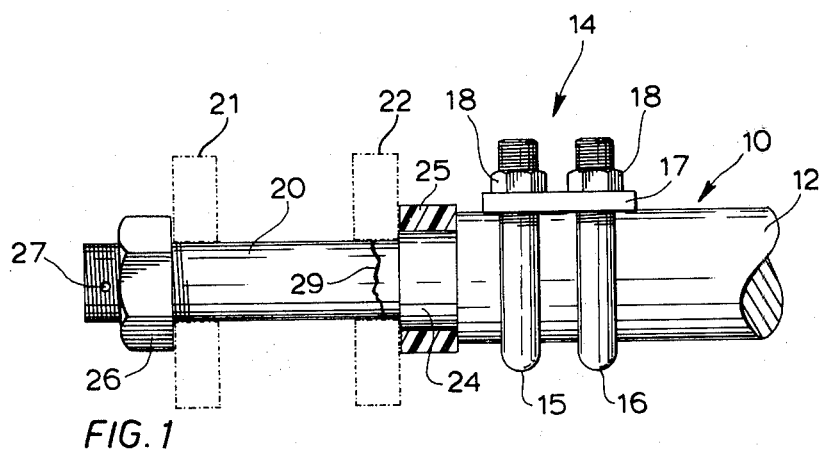
FIG. 1 is a fragmentary elevational view of an axle of a type as conventionally used on lightweight trailers with certain parts shown schematically and in section.

Referring first to FIG. 1, there is shown therein generally at 10 an axle of a type as conventionally used on lightweight trailers. The axle 10 comprises an axle shaft 12 which has a generally circular transverse sectional configuration and which is secured to the chassis (not shown) of a trailer by a spring-clamping shackle generally indicated at 14 and including U-bolts 15 and 16, a clamping plate 17 and nuts 18.

At each of its ends, the axle shaft 12 is integrally formed with a cylindrical axle spindle 20 of smaller diameter than the shaft 12 and on which wheel bearings shown schematically at 21 and 22 in FIG. 1 are received. Since the construction of the bearings 21 and 22 is not relevant to this invention, it will not be described in greater detail herein. At its inner end, each axle spindle is integrally formed with an intermediate cylindrical portion 24 of slightly larger diameter and on which a conventional grease seal 25 is mounted. For convenience, such portion 24 and the corresponding portion provided on an adaptor of this invention will hereinafter be referred to as "sleeves."

The outer end of the axle spindle 20 is threaded to receive a wheel-retaining nut 26 and a diametrical bore 27 is provided for receiving a nut-locking pin (not shown).

As already indicated, axle failure often occurs due to the excessive stresses applied to such axles during use. Such failure or spindle fracture normally occurs near the inner end of the axle spindle 20 and slightly outwardly of the outer end of the sleeve 24, for example, as indicated at 29 in FIG. 1.

Figure 4:
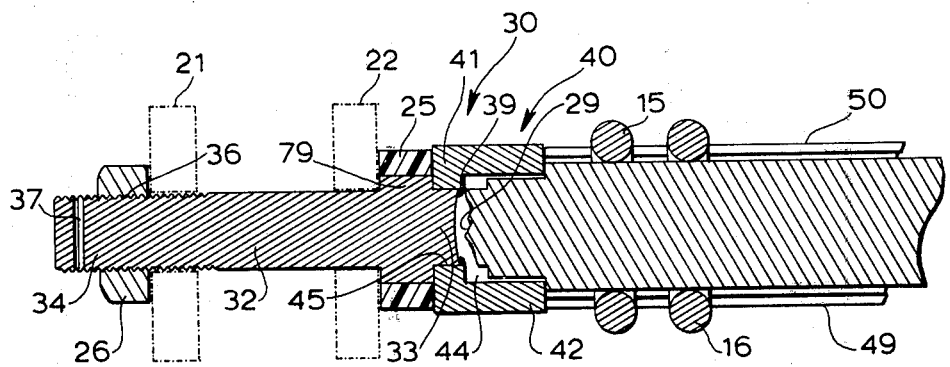
FIG. 4 is an enlarged, fragmentary and axial sectional view through the structure shown in FIG. 3 when taken as indicated by the arrows 4—4 of that figure and also showing certain other conventional components fitted thereon.

One embodiment of an axle adaptor in accordance with this invention and intended to be used to provide a temporary axle spindle after failure of the existing spindle of an axle is shown generally at 30 in FIGS. 2, 3 and 4.

The adaptor 30 comprises an axle spindle 32 having inner and outer ends 33 and 34 respectively and of essentially the same dimensions (diameter and length) as the axle spindle 20 of the existing axle 10, the sleeve 24 being considered as forming part of that spindle 20. At its outer end 34, the axle spindle 20 is threaded as at 36 to receive the wheel-retaining nut 26 and is provided with a diametrical bore 37 for receiving a nut-locking pin.

At its inner end 33, the axle spindle 32 is secured, for example, by welding as indicated at 39 in an end wall 41 of a generally cylindrical cup generally indicated at 40 and also, comprising an outer wall 42 defining a generally cylindrical and inwardly facing recess 44 having a diameter only very slightly larger than that of the sleeve 24 of the axle 10 on which the adaptor 30 is to be used. It will be noted that, in the particular adaptor 30 shown in FIGS. 2, 3, and 4, the inner end 33 of the axle spindle is received in an opening 45 in the end wall 41 of the cup 40 for welding to that wall 41 as at 39 internally of that cup.

The adaptor 30 also comprises a bracing member generally indicated at 48 and in the form of an angle member having elongated flanges 49 and 50 and inner and outer ends 51 and 52 respectively. At the outer end 52, the inside surfaces of the flanges 49 and 50 of the angle member 48 are secured, for example, by welding as indicated at 53, to the cup 40 externally thereof. The angle member 48 extends inwardly from the cup 40 in a direction generally parallel to the axis of the axle spindle 32.

Toward the inner end 51 of the angle member 48, there is secured thereto a shackle generally indicated at 56 and by means of which the adaptor 30 can be secured to the shaft of an axle in a manner yet to be described. The shackle 56 comprises first and second rods generally indicated at 57 and 58 respectively and which are secured, for example, by welding as indicated at 59, to the outer surfaces of respective ones of the flanges 49 and 50 of the angle member 48. The rods 57 and 58 comprise upstanding and generally parallel legs 60 and 61 respectively which are terminally threaded as indicated at 62.

The shackle 56 also comprises a clamping plate 64 having spaced apart openings 65 and 66 therethrough for receiving respective ones of the legs 60 and 61. Nuts 67 are screwed onto the ends of the legs 60 and 61.

The adaptor 30 is also provided for a purpose yet to be explained and toward the inner end 51 of the angle member 48 with short rods or spacing members 71 and 72 which are welded to the inside surfaces of respective ones of the flanges 49 and 50 of the angle member 48 near the edges of those flanges.

In accordance with another useful feature of this invention, the cup 40 of the adaptor 30 is formed through its outer wall 42 with mutually angularly spaced apart and internally threaded radial bores 74 and 75 in which there are screwed clamping bolts 76 and 77 respectively.

In accordance with another useful feature of this invention, the axle spindle 32 of the adaptor 30 is integrally formed at its inner end with a portion or sleeve 79 having essentially identical dimensions (diameter and length) as the sleeve 24 of the axle 10.

Having described the construction of the axle adaptor 30, the manner in which that adaptor is used to provide a temporary axle spindle on the axle 10 from which the original spindle 20 had broken off will now be explained.

For such use, the nuts 67 and the clamping plate 64 are first removed from the legs 60 and 61 of the shackle 56. The clamping bolts 76 and 77 in the cup 40 are then loosened. The grease seal 25 is next removed from the sleeve 24 of the axle 10 and the adaptor 30 is then placed on the end of that axle 10 so that the sleeve 24 is received within the cup 40 and so that the legs 60 and 61 of the shackle 56 project upwardly on opposite sides of the axle shaft 12. The clamping plate 64 is then placed over the legs 60 and 61 and the nuts 67 are then screwed onto those legs and tightened until the shackle 56 firmly clamps the adaptor 30 on the axle shaft 12. The bolts 76 and 77 are then tightened into engagement with the sleeve 24 within the cup 40 to provide additional clamping action.

It will now be understood that, when the adaptor is so clamped on an axle such as the axle 10, the U-bolts 15 and 16 of the existing spring-clamping shackle 14 will engage the inside surfaces of the flanges 49 and 50 of the angle member 48 near the outer end 52 of that angle member. Similarly, the spacing members 71 and 72 on those inside surfaces of those flanges near the inner end 51 of the angle member 48 will engage the shaft 12 so in turn to position that angle member 48 so that it is generally parallel to the longitudinal axis of the axle shaft 12 and so that the axle spindle 32 of the adaptor 30 will be in the same position as the original axle spindle 20. The grease seal 25 is then moved along the axle spindle 32 until it is received on the sleeve 79 at the inner end thereof. A wheel (not shown) is then placed on the axle spindle 32 so that the bearings 21 and 22 thereof are positioned as shown in FIG. 4. The wheel-retaining nut 26 is then screwed onto the threaded end 36 of the spindle 32 to hold the wheel in position thereon and a nut-retaining pin (not shown) is then inserted into the bore 37 in a conventional manner.

As already explained, when the axle spindle of an axle of the type in question fractures, the fracture nearly always occurs very close to the outer edge of the sleeve 24 of the axle spindle since, at that position, the operating stresses are greatest. If, however, an axle spindle should fracture at a position somewhat nearer the outer end of the spindle, it might then be necessary to remove the remaining spindle portion, for example, using a hack saw.

Figure 5:
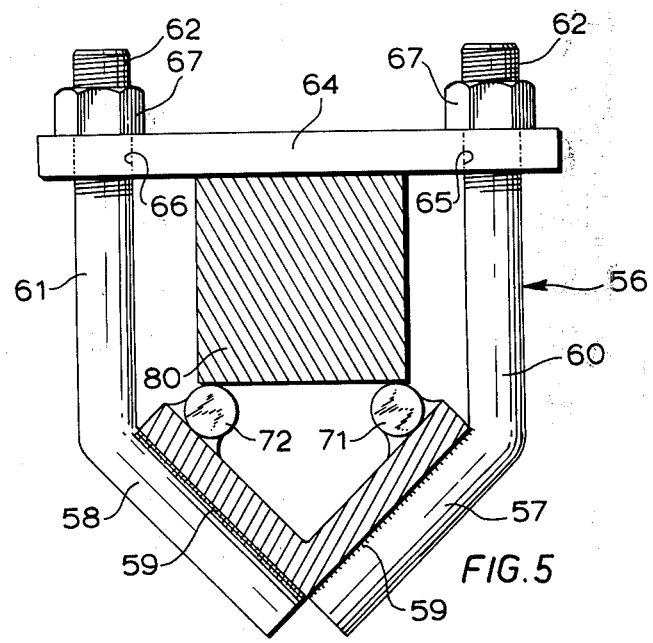
FIG. 5 is a transverse sectional view showing the axle adaptor of FIGS. 2 to 4 fitted on an axle having an axle shaft with a square transverse sectional configuration.

Referring now to FIG. 5 of the accompanying drawings, there is illustrated therein the manner in which the shackle 56 of the adaptor 30 functions to clamp that adaptor on an axle having an axle shaft 80 which has a square transverse sectional configuration. It is believed that FIG. 5 is self-explanatory and that no further description thereof is, therefore, required herein.

Although the invention has hereinbefore been specifically described with reference to the particular embodiment of an axle adaptor in accordance therewith and as generally indicated at 30, it will be understood that numerous variations in and modifications of the structure described are possible. It is, for example, possible to provide a separate sleeve which can be slid over the end of the axle spindle 32 of the adaptor so to provide a seating for a seal 25 instead of integrally forming a larger diameter portion, such as the sleeve 24, with the spindle for such a purpose.

Other variations and modifications within the scope of this invention will be readily apparent to those conversant with the relevant technologies.

What I claim is:

1. An axle adaptor which comprises:
    an axle spindle having inner and outer ends and formed at said inner end thereof with a larger diameter portion;

a cup secured to said axle spindle at said inner end thereof and defining a generally cylindrical recess essentially coaxial with said spindle, facing inwardly for receiving the end of a broken axle shaft on which said adaptor can be secured and having a diameter essentially equal to the diameter of said larger diameter portion of said axle spindle;

a bracing member having inner and outer ends and secured at said outer end thereof to said cup externally thereof to extend inwardly therefrom and generally parallel to said axle spindle; and a shackle on said bracing member toward said inner end thereof for securing said adaptor on an axle shaft with said axle spindle essentially coaxial with such an axle shaft.

2. An axle adaptor which comprises:

an axle spindle having inner and outer ends;

a cup secured to said axle spindle at said inner end thereof and defining a generally cylindrical recess essentially coaxial with said spindle and facing inwardly for receiving the end of a broken axle shaft on which said adaptor can be secured;

a bracing member having inner and outer ends and secured at said outer end thereof to said cup externally thereof to extend inwardly therefrom and generally parallel to said axle spindle;

a shackle on said bracing member toward said inner end thereof for securing said adaptor on an axle shaft with said axle spindle essentially coaxial with such an axle shaft; and clamping means operatively associated with said cup for releasable engagement with the end of a broken axle shaft received within said cup.

3. An axle adaptor as claimed in claim 2 and in which said clamping means comprises at least two shaft clamping members extending generally radially through said cup in threaded engagement therewith for tightening onto the end of an axle shaft received within said cup.

4. An axle adaptor which comprises:

an axle spindle having inner and outer ends;

a cup secured to said axle spindle at said inner end thereof and defining a recess essentially coaxial with said spindle and facing inwardly for receiving the end of a broken axle shaft on which said adaptor can be secured;

a bracing member having inner and outer ends and secured at said outer end thereof to said cup externally thereof to extend inwardly therefrom and generally parallel to said axle spindle;

a shackle on said bracing member toward said inner end thereof for securing said adaptor on an axle shaft with said axle spindle essentially coaxial with such an axle shaft; and a spacing member on said bracing member toward said inner end thereof for maintaining said axle spindle essentially coaxial with an axle shaft on which said adaptor is mounted when a spring-retaininng shackle is present about such an axle shaft generally terminally thereof.

5. An axle adaptor which comprises:

an axle spindle having inner and outer ends;

a cup secured to said axle spindle at said inner end thereof and defining a recess essentially coaxial with said spindle and facing inwardly for receiving the end of a broken axle shaft on which said adaptor can be secured;

a bracing member comprising an angle member having mutually angularly disposed and elongated first and second flanges, having inner and outer ends and secured at said outer end thereof to said cup externally thereof to extend inwardly therefrom and generally parallel to said axle spindle; and a shackle on said bracing member toward said inner end thereof for securing said adaptor on an axle shaft with said axle spindle essentially coaxial with such an axle shaft.

6. An axle adaptor as claimed in claim 5 and which additionally comprises first and second spacing members mounted on inside surfaces of respective ones of said first and second flanges of said bracing member toward said inner end thereof for maintaining said axle spindle essentially coaxial with an axle shaft on which said adaptor is mounted when a spring-retaining shackle is present about such an axle shaft generally terminally thereof.

7. An axle adaptor as claimed in claim 5 in which said shackle comprises a pair of rods externally secured to respective ones of said first and second flanges of said bracing member so as to be disposed on opposite sides of an axle shaft on which said adaptor is fitted, and a clamping plate for detachable securement across said rods in turn to secure said adaptor to an axle shaft.

8. An axle adaptor as claimed in claim 7 and in which said rods are terminally threaded to receive nuts for holding said clamping plate against an axle shaft on which said adaptor is mounted.

* * * * *